US008890943B2

United States Patent
Lee et al.

(10) Patent No.: US 8,890,943 B2
(45) Date of Patent: Nov. 18, 2014

(54) THREE DIMENSIONAL IMAGE SYSTEM

(75) Inventors: Wookeun Lee, Gimpo-si (KR); Hyunjin Park, Paju-si (KR); Jonghoon Woo, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 874 days.

(21) Appl. No.: 12/907,500

(22) Filed: Oct. 19, 2010

(65) Prior Publication Data

US 2011/0157333 A1 Jun. 30, 2011

(30) Foreign Application Priority Data

Dec. 30, 2009 (KR) ........................ 10-2009-0134689

(51) Int. Cl.
- H04N 13/04 (2006.01)
- H04N 9/47 (2006.01)
- G02B 27/26 (2006.01)
- G02C 7/12 (2006.01)

(52) U.S. Cl.
CPC G02B 27/26 (2013.01); G02C 7/12 (2013.01); H04N 13/0434 (2013.01); H04N 13/0438 (2013.01)
USPC ............................................. 348/56; 345/187

(58) Field of Classification Search
CPC ............... G02B 27/26; H04N 13/0434; H04N 13/0438; G02C 7/12
USPC ................................ 348/56; 349/15; 345/187
See application file for complete search history.

(56) References Cited

U.S. PATENT DOCUMENTS

| 6,084,647 | A  | * | 7/2000 | Hatano et al. ................... 349/15 |
| 6,252,624 | B1 |   | 6/2001 | Yuasa et al. |
| 6,266,106 | B1 | * | 7/2001 | Murata et al. ................... 349/15 |
| 2002/0118276 | A1 |   | 8/2002 | Seong |

FOREIGN PATENT DOCUMENTS

| GB | 2470623 A | 12/2010 |
| KR | 1020080062909 A | 7/2008 |

OTHER PUBLICATIONS

Search and Examination Report issued in corresponding British Patent Application No. GB 1014789.0, mailed Jan. 7, 2011.

* cited by examiner

*Primary Examiner* — Richard Torrente
*Assistant Examiner* — Richard Carter
(74) *Attorney, Agent, or Firm* — Brinks Gilson & Lione

(57) ABSTRACT

The present disclosure relates to a three-dimensional image system. The present disclosure suggests a three dimensional image system comprising: a display device configured to suggest a left image and a right image alternately; a liquid crystal shutter having a liquid crystal layer and configured to switch between a λ/2 phase retardation state and a 0 phase retardation state; polarized glasses including a right glass window having a first polarization axis and a left glass window having a second polarization axis. According to the present disclosure, the left image and the right image can be exactly recognized by the left eye and the right eye, respectively, without any cross-talk problem.

5 Claims, 9 Drawing Sheets

THREE DIMENSIONAL IMAGE SYSTEM

This application claims the benefit of Korea Patent Application No. 10-2009-0134689, filed on Dec. 30, 2009, the entire contents of which is incorporated herein by reference for all purposes as if fully set forth herein.

BACKGROUND

1. Field of the Invention

The present disclosure relates to a three-dimensional (or "3D") image system. Especially, the present disclosure relates to a 3D image system minimizing the cross-talk between the left and right images.

2. Discussion of the Related Art

The technologies for the 3D image systems, as the next generation information & communication services in which many companies are competing to get technologies and market share in advance, are variously applied to the high technique fields includes broadcasting system, medical system, educational system, military system, animation system, virtual reality system, CAD system, industrial system and so on. That is, the 3D technology is a base and core technology for the next generation multimedia information-communication fields.

The screen volume recognized by human is caused by any combinations of the variations of the thickness of the eye lens according to the location of the object, the angle difference between the left image and the right image of the object, the position and shape differences between the left image and the right image of the object, the parallax error according to the movement of the object, and the effects according to the memory and mind of the observer. At most, the binocular parallax caused by the human two eyes apart from 6~7 cm each other is the most important factor for feeling the 3D images. By the binocular parallax, the left view lines from the left eye to the object and the right view line from the right eye to the object are not the same but have an angle difference. Due to this angle difference, the image shape of left eye is different from that of the right eye. These two different images are sent from both eyes to the brain and then the 3D images are recognized by that the brain combines these different visual images.

There are various methods for implementing the 3D images using 2D display device. The shutter method in which the left image and right image are alternately represented using a liquid crystal panel is the most developed. The most important thing for the 3D image system is that the left image and the right image should be exactly sent to the left eye and the right eye, respectively. If the left image is sent to the right eye in a little time instance or vice versa, it is impossible to enjoy the 3D images. This problem is called as the static cross-talk. In the 3D image system, it is most important to prevent the cross-talk problems.

BRIEF SUMMARY

A three dimensional image system comprises: a display device configured to suggest a left image and a right image alternately; a liquid crystal shutter having a liquid crystal layer and configured to switch between a $\lambda/2$ phase retardation state and a 0 phase retardation state; polarized glasses including a right glass window having a first polarization axis and a left glass window having a second polarization axis.

The liquid crystal shutter may comprises: a first substrate; a first electrode disposed on an inside surface of the first substrate; a second substrate facing with the first substrate inserting the liquid crystal; and a compensation film attached on an outside of the second substrate.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Figure 1:
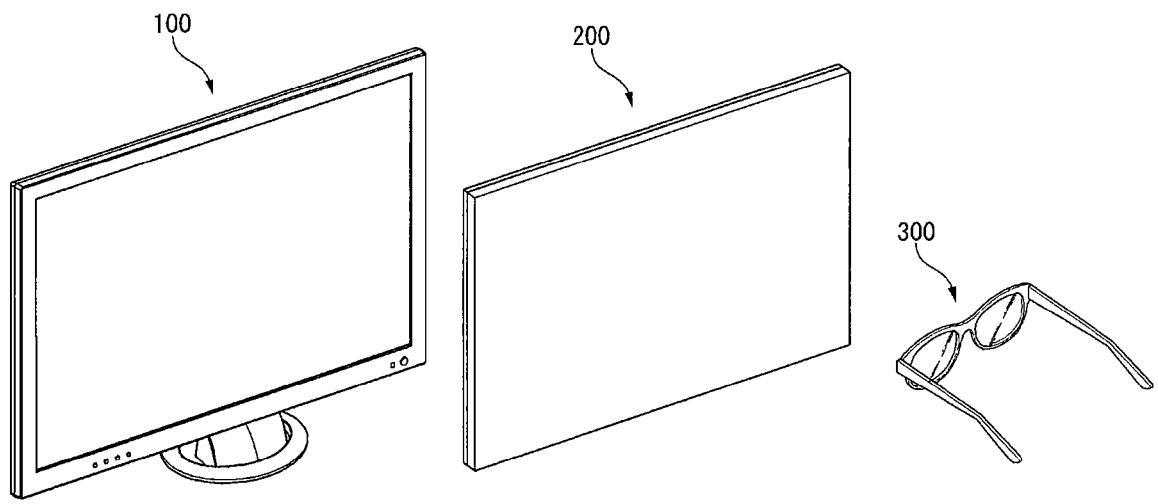
FIG. 1 is a perspective view illustrating a structure of a 3D image system according to the present disclosure.

Advantages and features of the present disclosure and a method of achieving the advantages and the features will be apparent by referring to embodiments described below in detail in connection with the accompanying drawings. Hereinafter, referring to the drawings, some preferred embodiments of the present disclosure are explained in detail. However, the present disclosure is not restricted by these embodiments but can be applied to various changes or modifications without changing the technical spirit. In the following embodiments, the names of the elements are selected by considering the easiness for explanation so that they may be different from actual names.

Referring to FIGS. 1 to 10, the 3D image system using a liquid crystal shutter according to the preferred embodiments of the present disclosure will be explained. FIG. 1 is a perspective view illustrating a structure of a 3D image system according to the present disclosure.

Referring to FIG. 1, the 3D image system according to the first embodiment of the present disclosure comprises a display device 100, a polarized glasses 300 used by an observer of the 3D images represented by the display device 100, and a liquid crystal shutter 200 disposed between the display device 100 and the polarized glasses 300.

The display device 100 of the first embodiment provides the 2D images or the 3D images. The 3D images include the left image and the right image alternately represented in a frame period. The display device 100 can be any one of the CRT (Cathode Ray Tube), the liquid crystal display device (LCD), the plasma display device (PDP), and the organic light emitting diode display device (OLED). The display device 100, when providing the 3D images, represents the left image for a predetermined time period and then right image for a next predetermined time period.

Figure 2:
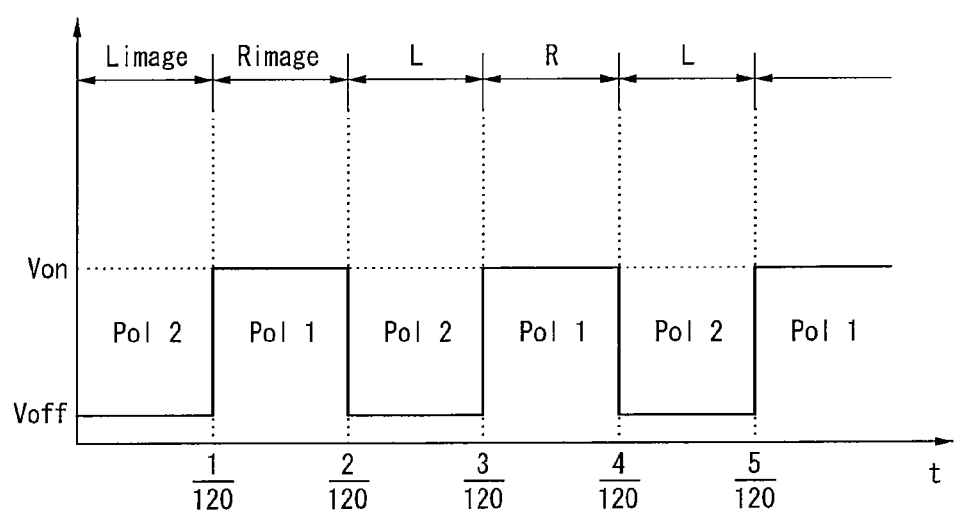
FIG. 2 is a graph illustrating an example for representing the left image and the right image using the time sharing method in the display device according to the present disclosure.

FIG. 2 is a graph illustrating an example for representing the left image and the right image using the time sharing method in the display device according to the present disclosure. During the first $1/120$ seconds, the left image of the first frame is represented and then, during the next $1/120$ seconds, the right image of the first frame is represented, so that the full first frame of the 3D image can be represented during $1/60$ seconds. The display device 100 can suggest the left image and the right image using a linearly polarized light along to the first direction. In the first embodiment of the present disclosure, considering the optical characteristics of the liquid crystal material layer 251 explained in below, the light is linearly polarized in 45° direction, preferably.

Figure 3:
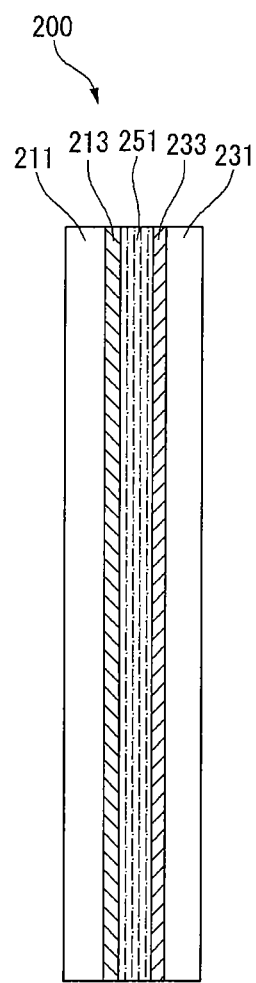
FIG. 3 is a cross-sectional view illustrating the liquid crystal shutter according to the first embodiment of the present disclosure.

The liquid crystal shutter 200 according to the first embodiment has the structure as shown in FIG. 3. FIG. 3 is a cross-sectional view illustrating the liquid crystal shutter according to the first embodiment of the present disclosure. The liquid crystal shutter 200 comprises a first transparent substrate 211 and a second transparent substrate 231 which are jointed each other, and a liquid crystal layer 251 is inserted therebetween. On each inside surface of the first substrate 211 and the second substrate 231, a first transparent electrode 213 and the second transparent electrode 233 for driving the liquid crystal layer 251 are formed, respectively. At the initial condition, the liquid crystal layer 251 is arranged in horizontally parallel to the first and the second substrates 211 and 231. When a vertical electric field is applied between the first transparent electrode 213 and the second transparent electrode 233, the liquid crystal layer 251 is re-aligned in the vertical direction to the first and the second substrates 211 and 231 according to the electric field direction. The liquid crystal layer 251 driven by the vertical electric field may be the vertical alignment (VA) mode, the electrically controlled birefringence (ECB) mode, or the optically compensated bend (OCB) mode. Furthermore, when the light is passing through the liquid crystal layer 251, the light has phase retardation due to the optical anisotropic property of the liquid crystal material. In the first embodiment, the liquid crystal layer 251 is preferably designed such that the light has the $\lambda/2$ ($\lambda$ is wavelength of the light) of phase retardation after the light passes through the liquid crystal layer 251. To do this, the initial alignment direction of the liquid crystal layer 251 should be 0°.

Figure 4:
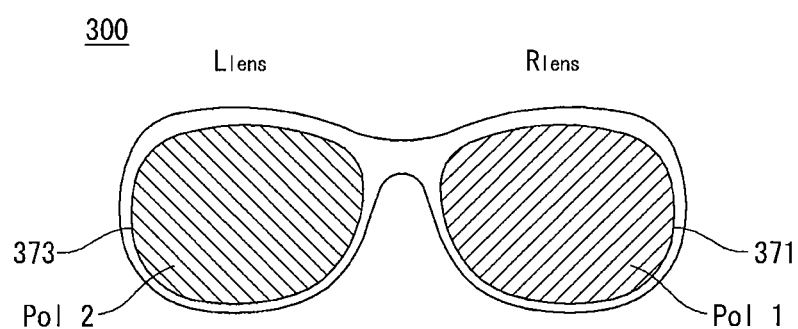
FIG. 4 is a diagram illustrating an example of the 3D glasses of the 3D image system according to the present disclosure.

Finally, the polarized glasses 300 according to the first embodiment have the structure as shown in FIG. 4. The polarized glasses 300, as the device for observing the 3D images represented in time sharing method, comprise a right glass window 371 for passing the polarized light in the first polarization direction Pol1 and a left glass window 373 for passing the polarized light in the second polarization direction Pol2.

In the first embodiment, the first polarization direction Pol1 of the right glass window 371 is set to 45° direction, and the second polarization direction Pol2 of the left glass window 373 is set to 135°. FIG. 4 is a diagram illustrating an example of the 3D glasses of the 3D image system according to the present disclosure.

Figure 5:
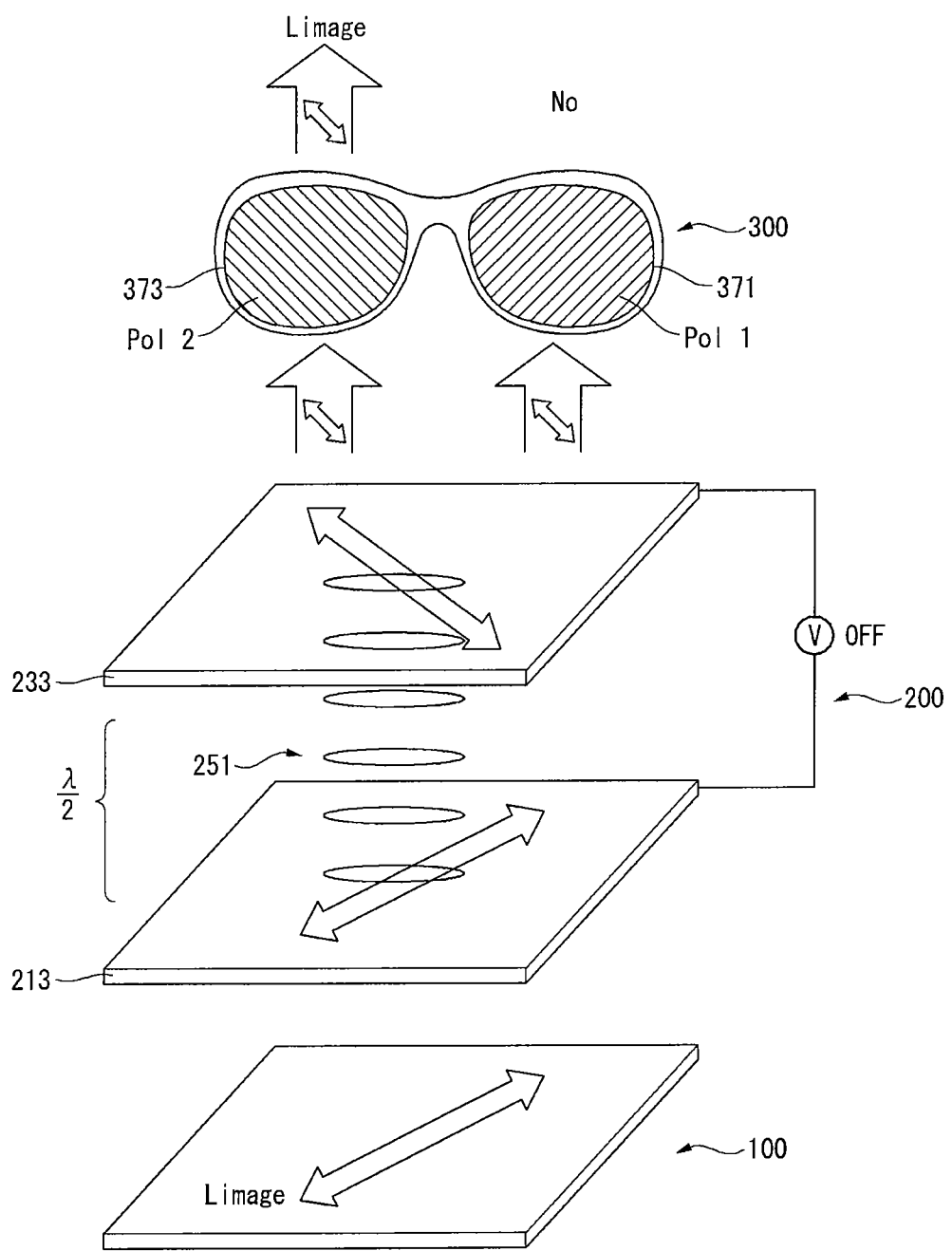
FIG. 5 is diagram illustrating how the 3D image system according to the first embodiment of the present disclosure represents the left image and how the observer recognizes the left image through the left eye.
Figure 6:
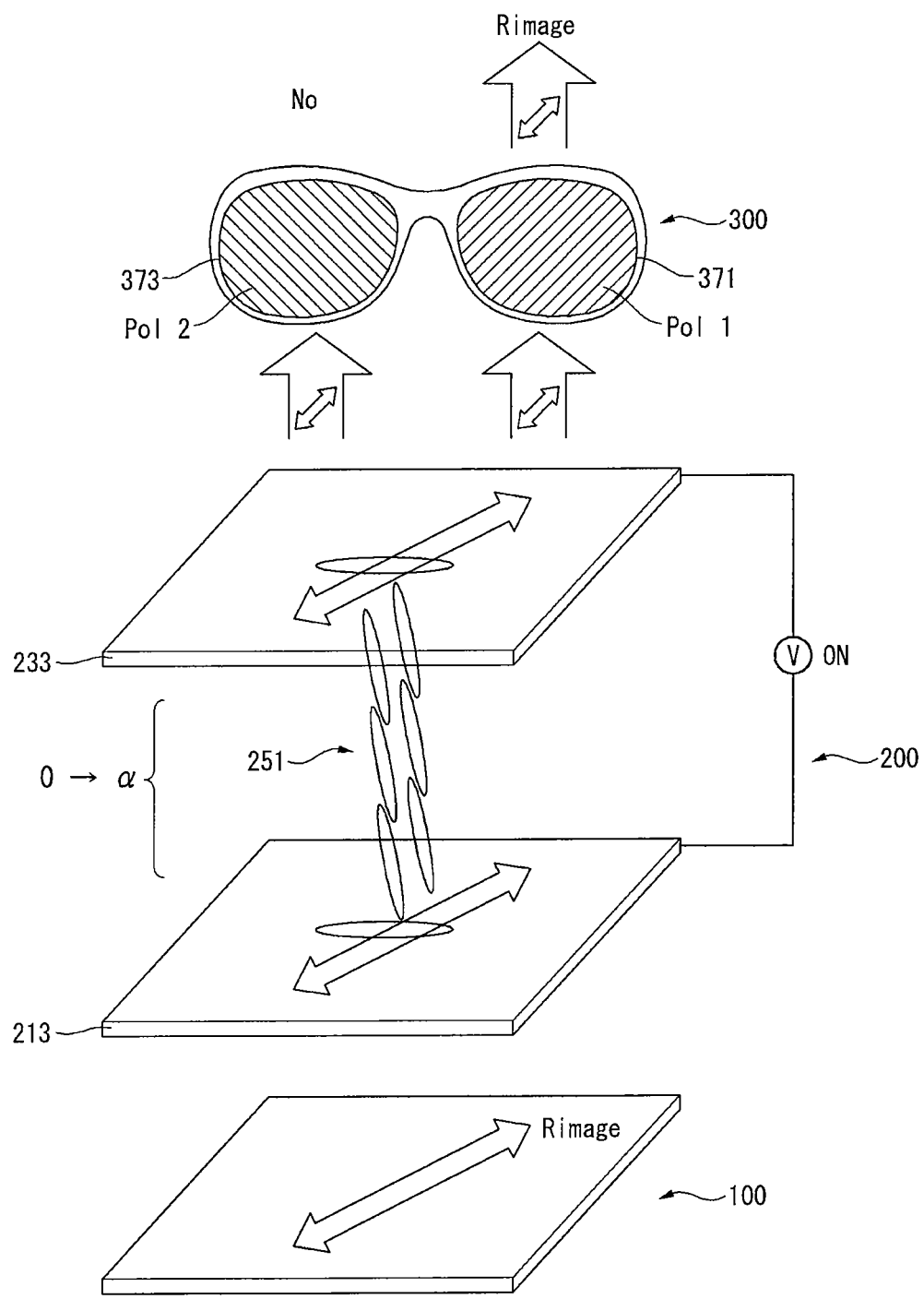
FIG. 6 is diagram illustrating how the 3D image system according to the first embodiment of the present disclosure represents the right image and how the observer recognizes the right image through the right eye.

Referring to FIGS. 5 and 6, the working principle of the 3D image system according to the first embodiment will be explained. FIG. 5 is diagram illustrating how the 3D image system according to the first embodiment of the present disclosure represents the left image and how the observer recognizes the left image through the left eye. FIG. 6 is diagram illustrating how the 3D image system according to the first embodiment of the present disclosure represents the right image and how the observer recognizes the right image through the right eye.

As shown in FIG. 2, the display device 100 represents the left image Limage for $1/120$ seconds. The display device 100 suggests all images using the linearly polarized light along to the 45° direction. That is, for $1/120$ seconds, the left image Limage of the first frame polarized in the first polarization direction (45° direction) is represented. At this time, there is no electric field between the first electrode 213 and the second electrode 233 of the liquid crystal shutter 200. Therefore, all liquid crystal molecules of the liquid crystal layer 251 are maintained the initial alignment condition, horizontally parallel to the surfaces of the first and the second substrates 211 and 231. Especially, the liquid crystal molecules are aligned to the 0° direction on the plane of the first and the second substrates 211 and 231. Then, the left image Limage incident to the liquid crystal shutter 200 meets the liquid crystal layer 251 of which long axis is crossed in 45° with the first polarization direction Pol1. The long axis refraction ratio of the liquid crystal layer 251 is different from the short axis refraction ratio. Therefore, due to this optical anisotropic property of the liquid crystal layer 251, the left image Limage has a phase retardation. As the liquid crystal shutter 200 is designed to have $\lambda/2$ of phase retardation as mentioned above, the left image passing through the liquid crystal layer 251 has the 90° phase retardation and then the polarization direction of the left image is changed in the direction along with the 135° direction. The left image Limage of which linearly polarization direction is changed can pass through the left glass window 373 of the polarized glasses 300, but it can not pass through the right glass window 371. Therefore, observer can recognize the left image Limage through the left eye only.

For the next $1/120$ seconds, the display device 100 represents the right image Rimage of the first frame polarized n the first polarization direction (45° direction). At this time, a vertical electric field is applied between the first electrode 213 and the second electrode 233 of the liquid crystal shutter 200 for driving the liquid crystal layer 251. Then the alignment direction of liquid crystal layer 251 is changed to the vertical direction between the first and the second substrates 211 and 231. In that case, the right image Rimage incident into the liquid crystal shutter 200 meets the liquid crystal layer 251 aligned to the vertical direction to the surface of the first and the second substrates 211 and 231. Therefore, the short axis refraction ratio exists only. As a result, the right image Rimage has no phase retardation (0 phase retardation), so that it can pass through the liquid crystal layer 251 with the original polarized direction (45° direction). The right image Rimage having the original polarization direction (45° direction) cannot pass the left glass window 371 of the polarized glasses 300, but pass the right glass window 373. Therefore, observer can recognize the right image Rimage through the right eye only.

Like this, the left image Limage of the first frame is recognized during the first 1/120 seconds, and then the right image Rimage of the first frame is recognized during the next 1/120 seconds, so that full 3D image of the first frame can be recognized for 1/60. Repeating these processes again and again, the observer can enjoy the full 3D video image.

According to the first embodiment above explained, when the right image is represented, the lower most molecules and the upper most molecules of liquid crystal layer 251 are not re-aligned by the vertical electric field, as shown in FIG. 6. Because that the lower most molecules and the upper most molecules of liquid crystal layer 251 are fixed by the alignment layers (not shown) attached inside surfaces of the first and the second substrates 211 and 231. Due to these residual liquid crystal molecules maintaining the initial alignment condition, the right image Rimage can have a residual retardation. For example, the phase retardation of the right image Rimage does not have the true 0 phase retardation, but it has the α phase retardation.

When designing the liquid crystal shutter 200, the phase retardation of the left glass window should be λ/2 and that of the right glass window should be 0, preferably. However, due to the residual retardation, the phase retardation of the right glass window may be α. Therefore, a cross-talk due to the α phase retardation may be occurred.

Figure 7:
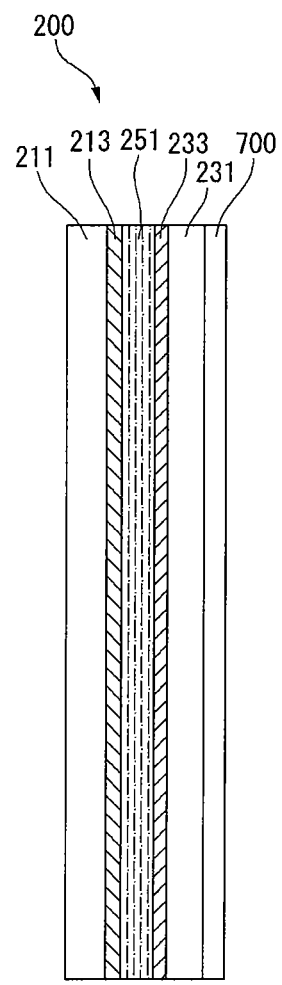
FIG. 7 is a cross-sectional view illustrating the liquid crystal shutter according to the second embodiment of the present disclosure.

In the second embodiment of the present disclosure, a 3D image system is suggested not having the problem of the first embodiment. FIG. 7 is a cross-sectional view illustrating the liquid crystal shutter 200 according to the second embodiment of the present disclosure. According to the second embodiment of the present disclosure, a compensation film 700 for compensating the α phase retardation is further included at the outer portion of the second transparent substrate 231 of the liquid crystal shutter 200. The compensation film 700 preferably includes an optical phase compensation film having a phase retardation, for example, the A-plate. Furthermore, in order to compensated the α phase retardation due to the residual retardation, the final phase retardation should be −α. To do this, the A-plate having the α phase retardation should be attached in manner that the light transparent axis of the A-plate is perpendicularly crossed with the liquid crystal molecules causing the residual retardation (the upper most liquid crystal molecules of the liquid crystal layer 251). That is, the initial alignment direction of the liquid crystal layer 251 and the light transparent axis of the compensation film should be crossed in 90°.

Figure 8:
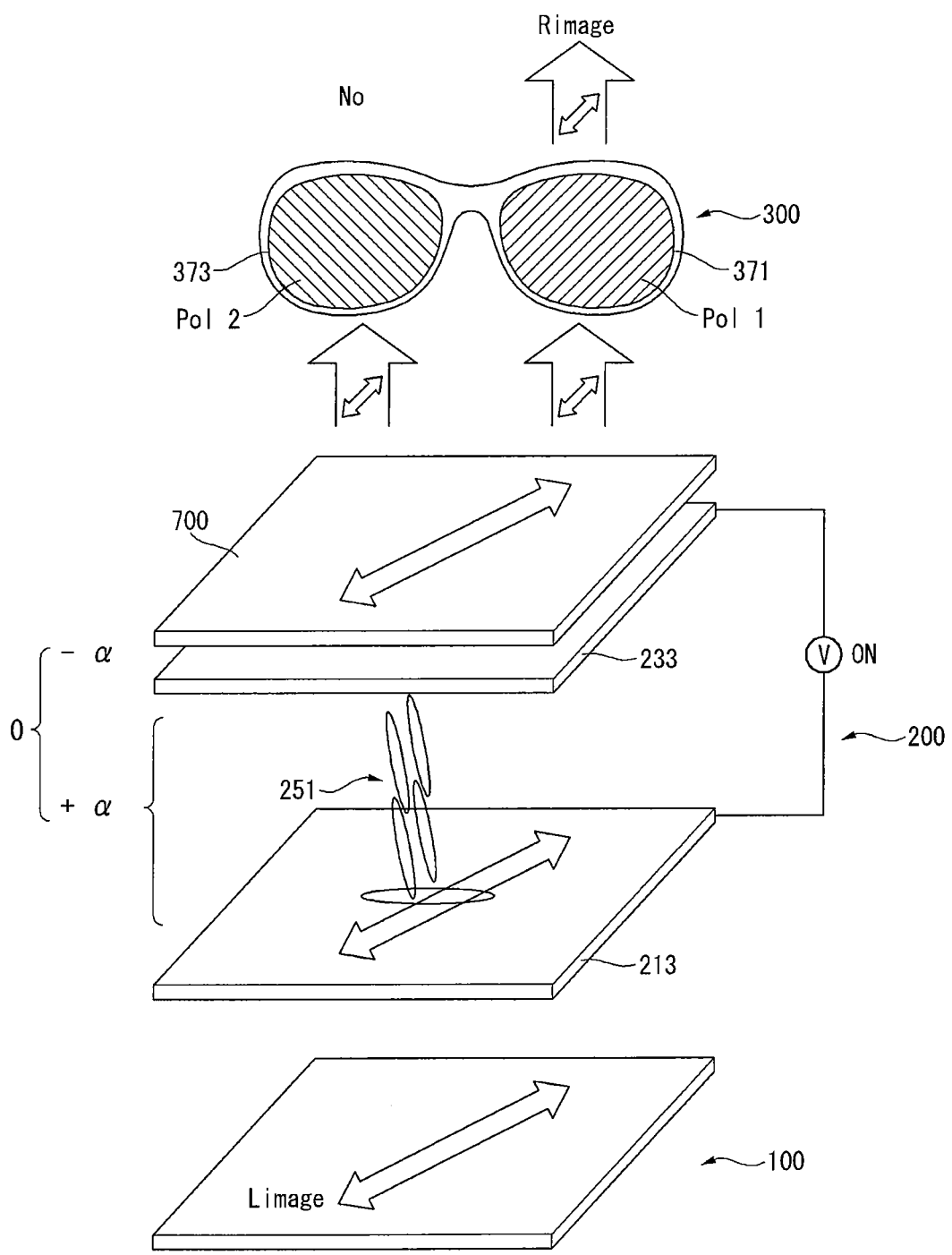
FIG. 8 is diagram illustrating how the 3D image system according to the second embodiment of the present disclosure represents the right image and how the observer recognizes the right image through the right eye.

As shown in FIG. 8, when the phase retardation is α due to the residual retardation of the liquid crystal layer 251, by using the compensation film 700, the α phase retardation can be eliminated. Therefore, the phase retardation of the right image can be truly 0. As a result, according to the second embodiment, the cross-talk caused by the residual retardation of the liquid crystal layer 251 is removed. FIG. 8 is diagram illustrating how the 3D image system according to the second embodiment of the present disclosure represents the right image and how the observer recognizes the right image through the right eye.

Figure 9:
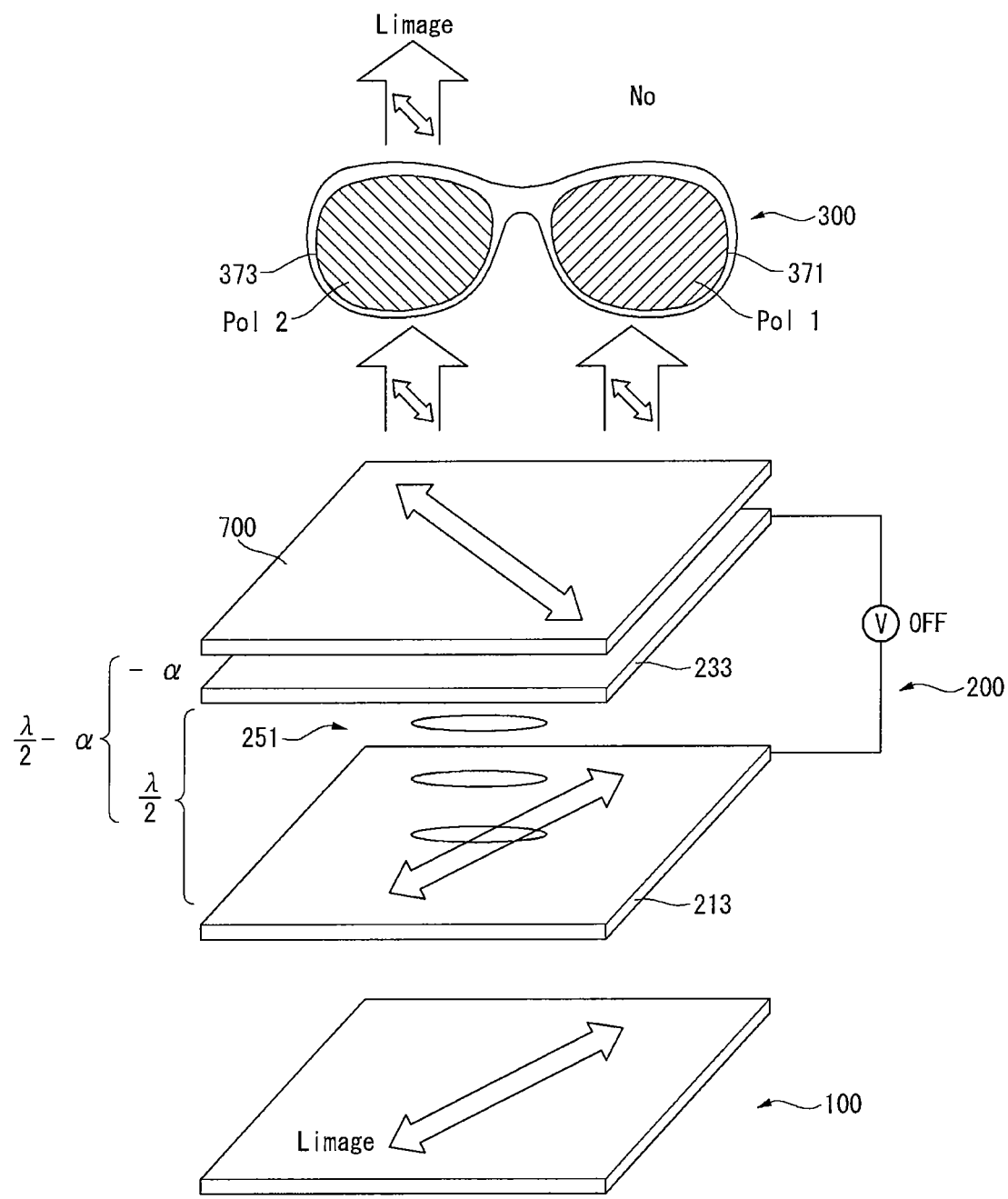
FIG. 9 is diagram illustrating how the 3D image system according to the second embodiment of the present disclosure represents the left image and how the observer recognizes the left image through the left eye.

However, using the liquid crystal shutter 200 having the structure according to the second embodiment has another problem when representing the left image. When representing the left image, the left image should have phase retardation of λ/2. As shown in FIG. 9, due to the phase retardation α of the compensation film 700, the result phase retardation of the left image is λ/2−α. FIG. 9 is diagram illustrating how the 3D image system according to the second embodiment of the present disclosure represents the left image and how the observer recognizes the left image through the left eye. That is, in the second embodiment of the present disclosure, the residual retardation can be eliminated but the left image has new cross-talk problem due to the compensation film 700.

The third embodiment of the present disclosure suggests a 3D image system eliminating any cross-talk problems announced in the first and second embodiments. The liquid crystal shutter 200 is preferably designed to operate in manner that the phase retardation of the liquid crystal layer 251 is switched between λ/2+α and α. For example, at the initial condition in which there is no electric field between the first electrode 213 and the second electrode 233, the phase retardation of the liquid crystal layer 251 is preferably (λ/2+α). When a vertical electric field is applied between the first electrode 213 and the second electrode 233, the phase retardation of the liquid crystal layer 251 is preferably α. Further, an optical compensation film 700 having the phase retardation of α is attached on the outer surface of the second substrate 231.

Figure 10:
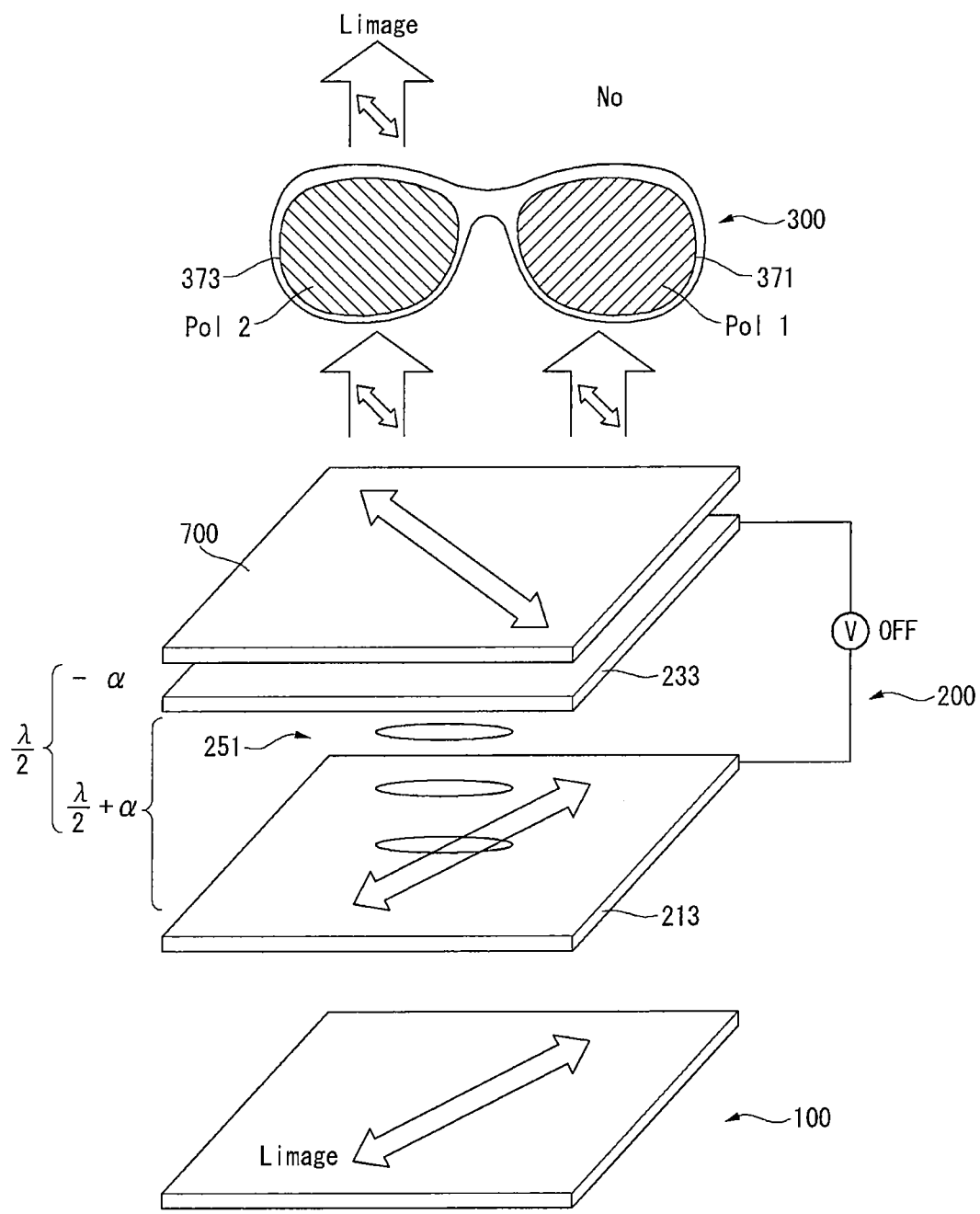
FIG. 10 is diagram illustrating how the 3D image system according to the third embodiment of the present disclosure represents the left image and how the observer recognizes the left image through the left eye.

Especially, as the optical compensation film 700 is for eliminating the α phase retardation due to the residual retardation, it should be attached to have −α phase retardation. To do this, the compensation film 700 having the α phase retardation should be attached in manner that the light transparent axis of the compensation film 700 is perpendicularly crossed with the liquid crystal molecules causing the residual retardation (the upper most liquid crystal molecules of the liquid crystal layer 251). That is, the initial alignment direction of the liquid crystal layer 251 and the light transparent axis of the compensation film should be crossed in 90°. Then, when the left image is represented, the phase retardation of the liquid crystal shutter 200 is (λ/2+α)−α, so that it has phase retardation of λ/2. FIG. 10 is diagram illustrating how the 3D image system according to the third embodiment of the present disclosure represents the left image and how the observer recognizes the left image through the left eye.

In the interim, when the right image is represented, the condition is the same with the FIG. 8 showing how the 3D image system according to the second embodiment of the present disclosure represents the left image and how the observer recognizes the left image through the left eye. That is, at the liquid crystal layer 251, the phase retardation of the right image is α due to the residual retardation. However, by the compensation film 700, the result phase retardation of the liquid crystal shutter 200 is (α−α)=0. The (−α) in the FIGS. 8 and 10 means that the optical compensation film having phase retardation of α is attached to eliminate the phase retardation of α due to the liquid crystal layer 251. That is, it means that the initial alignment direction of the liquid crystal layer 251 and the light transparent axis of the compensation film should be crossed in 90°.

Even though the liquid crystal layer 251 switches between the (λ/2+α) phase retardation state and the α phase retardation state. However, the liquid crystal shutter 200 having the compensation film 700 switches between the λ/2 phase retardation state and the 0 phase retardation state. As a result, there is no cross-talk between the left image and the right image.

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

The invention claimed is:

1. A three dimensional image system comprising:
    a display device configured to suggest a left image and a right image alternately in a frame period;
    a liquid crystal shutter including:
        a first substrate;
        a first electrode disposed on an inside surface of the first substrate;
        a second substrate, a second electrode disposed on the second substrate facing with the first substrate;
        a liquid crystal layer disposed between the first and second electrodes and configured to switch between a λ/2 phase retardation state and a 0 phase retardation state when the electrodes are switched between an OFF state and an ON state; and
        a compensation film having a phase retardation of a and attached on an outside of the second substrate; and
    polarized glasses including a right glass window having a first polarization axis and a left glass window having a second polarization axis,
    wherein the liquid crystal shutter is disposed between the display device and the polarized glasses,
    wherein the first and the second electrodes are alternately switched between the ON-state and the OFF-state in the frame period such that the left image passes through the left glass window but not the right glass window when the first and second electrodes are in one of the ON-state and the OFF-state and, that the right image passes through the right glass window but not the left glass window when the first and second electrodes are in the other one of the ON-state and the OFF-state,
    wherein the liquid crystal layer has a phase retardation of $(\lambda/2+\alpha)$ when there is no electric field between the first electrode and the second electrode, and
    wherein the liquid crystal layer has a phase retardation of $(+\alpha)$ when an electric field is applied between the first electrode and the second electrode.

2. The system according to the claim 1, wherein the compensation film is attached on the outside of the second substrate in manner that a light transparent axis of the compensation film is perpendicularly crossed with an initial alignment direction of the liquid crystal layer.

3. The system according to the claim 1, wherein the liquid crystal layer includes at least one of a vertical alignment mode liquid crystal, an electrically controlled birefringence mode liquid crystal, and an optically compensated bend mode liquid crystal.

4. The system according to the claim 1, wherein the display device represents the left image and the right image using a linearly polarized light along with 45°;
    the liquid crystal layer has an initial alignment direction along with 0°; and
    the first polarization direction is set to 45°, and the second polarization direction is set to 135°.

5. The system according to the claim 1, wherein the display device represents the left image and the right image by polarizing to a first direction;
    the liquid crystal layer has an initial alignment direction having 45° angle difference with the first direction;
    the first polarization direction is parallel to the first direction, and the second polarization direction is perpendicular to the first direction.

* * * * *